J. W. LYTTON.
TRAP.
APPLICATION FILED MAR. 15, 1915.
1,195,944.
Patented Aug. 22, 1916.
3 SHEETS—SHEET 3.
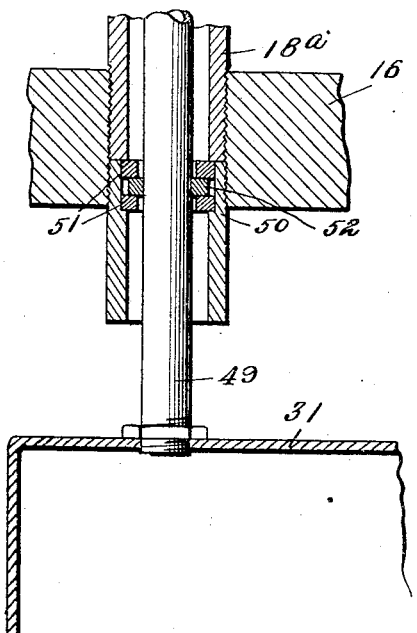
Fig 3.
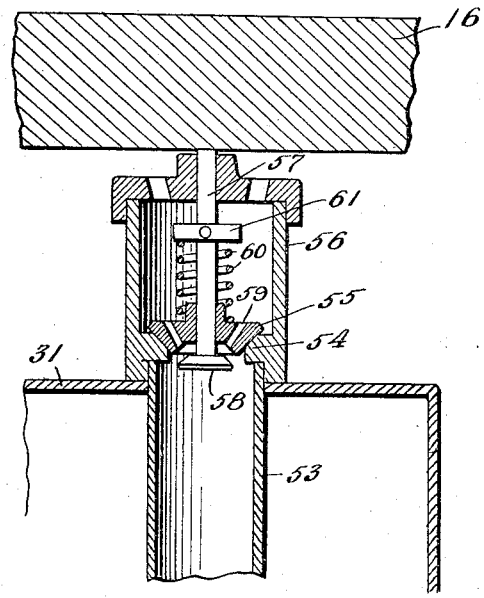
Fig 4.
Fig 5.
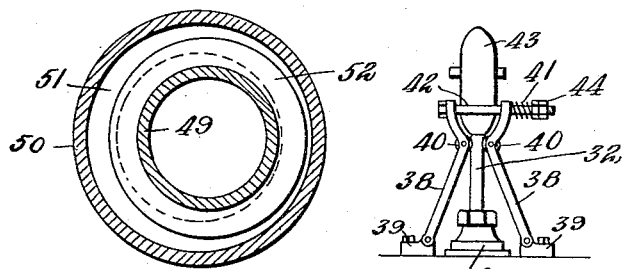
Fig 6.
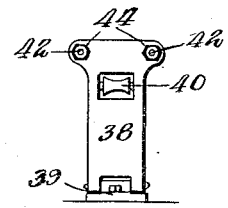
Fig 7.
Witnesses
H. A. Robinette
J. J. Mawhinney
Inventor
Jarard W. Lytton
By
[signature]
Attorney

UNITED STATES PATENT OFFICE.

JARARD W. LYTTON, OF FRANKLIN, VIRGINIA, ASSIGNOR TO LYTTON MANUFACTURING CORPORATION, OF FRANKLIN, VIRGINIA, A CORPORATION OF VIRGINIA.

TRAP.

1,195,944.  Specification of Letters Patent.  Patented Aug. 22, 1916.

Application filed March 15, 1915. Serial No. 14,358.

*To all whom it may concern:*

Be it known that I, JARARD W. LYTTON, a citizen of the United States, residing at Franklin, in the county of Southampton and State of Virginia, have invented new and useful Improvements in Traps, of which the following is a specification.

This invention relates to traps and feeders of that type in which pressure, or pressure and vacuum, are utilized to transfer automatically and periodically water and other liquids.

The present invention aims at the provision of certain hereinafter described improvements in the pressure inlet and outlet control for the actuating fluid, and in the arrangement of valves and connections between the actuating fluid inlet and the piston float of the trap.

Other objects and advantages of this invention will be more clearly brought out in the following detail description of the present preferred embodiment of this invention, the same being illustrated in the accompanying drawings wherein,—

Figure 1:
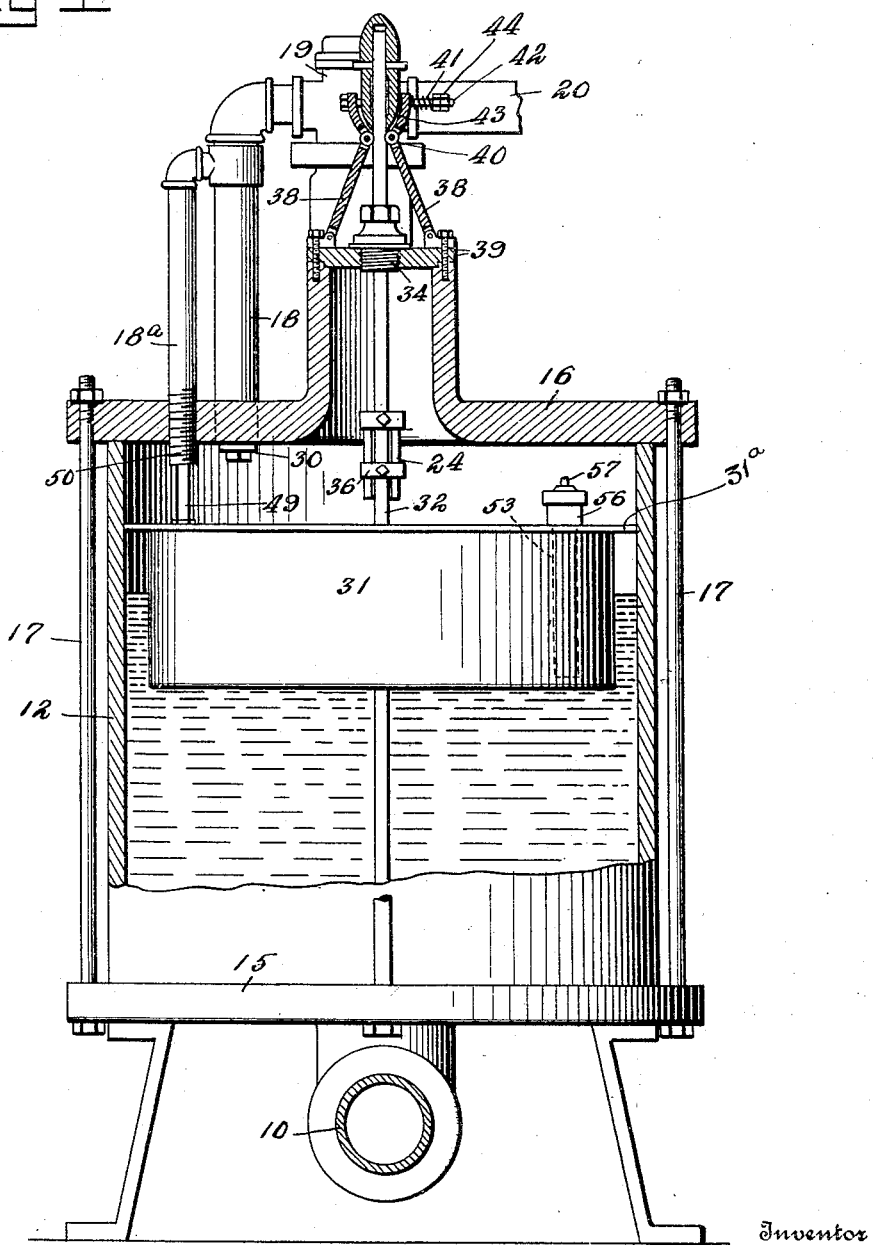
Figure 2:
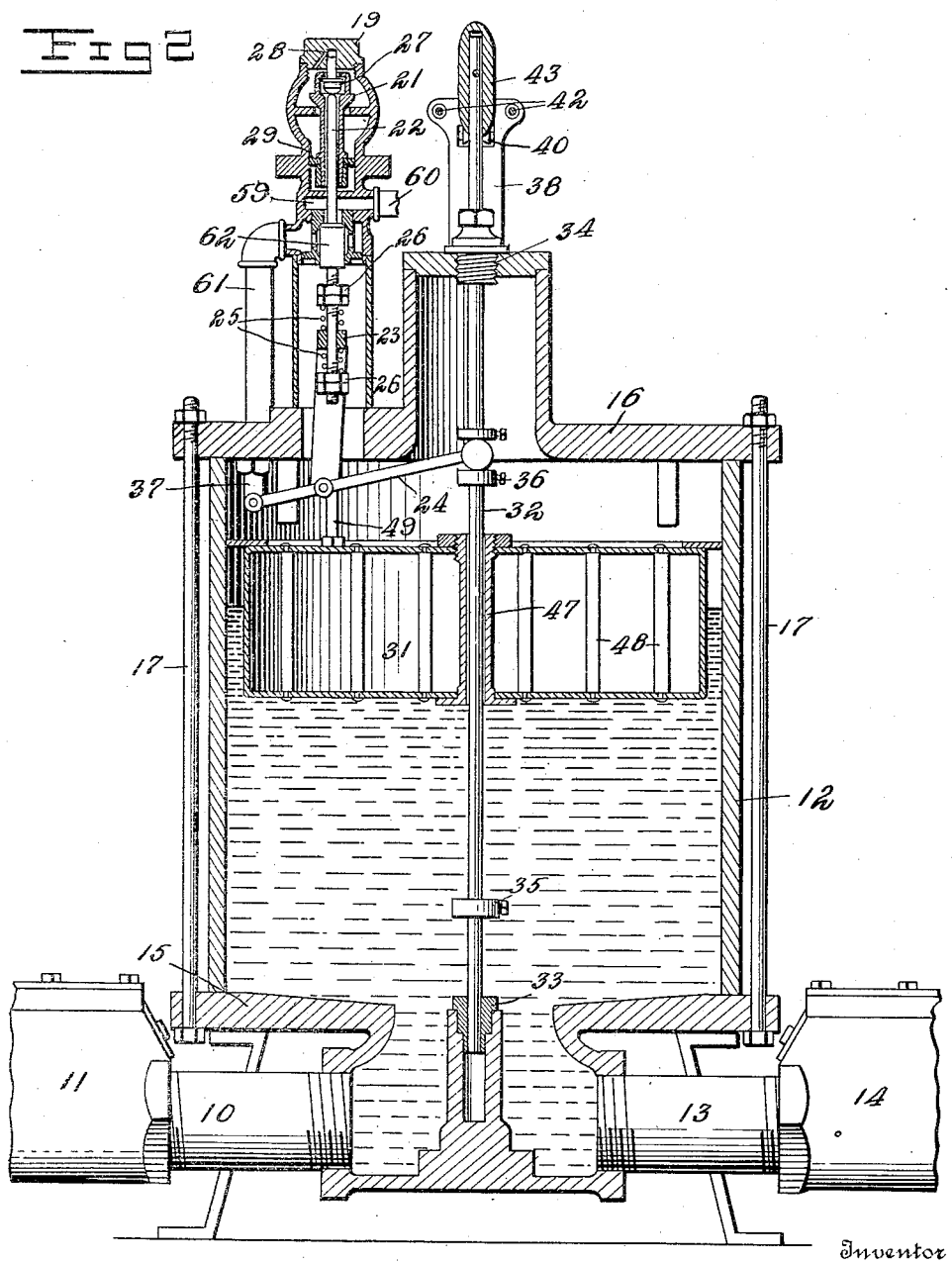

Figure 1 is a vertical sectional view of a trap and feeder made in accordance with this invention. Fig. 2 is a similar view taken at an angle to Fig. 1. Fig. 3 is a detail enlarged sectional view of the connection between the float and the inlet pipe for the actuating fluid. Fig. 4 is a detail enlarged sectional view of the combined inlet and outlet valve for the float. Fig. 5 is an enlarged transverse sectional view through the connection between the inlet pipe and the float, showing the arrangement of the packing rings. Figs. 6 and 7 are detail views of the friction clutch member used for the inlet and outlet control.

Referring to these drawings, wherein like parts are designated by similar characters of reference throughout the several views, 10 designates an inlet pipe in which is placed a non-return check valve 11 of any suitable type, the inlet pipe opening into the lower end of a cylinder or casing 12, and opposed to the inlet pipe 10 is an outlet pipe 13 having therein a suitable non-return check valve 14. The casing 12 may be of any suitable construction, but is preferably made as shown with a bottom 15 sloped centrally, and having a cap or cover 16 held to the casing 12 by tie rods 17 or the like. The casing 12 is provided at its upper end with an inlet pipe 18 to admit steam or air to the casing 12, the pipe 18 leading from a bonnet 19 which has suitable connection with a pressure source 20.

The bonnet 19 is provided with a valve 21 which is hollow, and through which passes a rod 22 having connection at its lower end, by an interposed link 23, with an actuating lever 24. For the purpose of absorbing the shock and preventing hammering of the operating parts, the link 23 is preferably connected to the rod 22 by a spring connection, as shown, and wherein springs 25 are carried on the rod 22 above and below the end of the link 23 and are adjusted as to tension by means of lock nuts 26.

The valve 21 is normally held closed by the actuating pressure, and a preliminary valve 27 is used. The valve 27 is preferably carried in a cage at the top of the valve 21, and receives the thrust of the valve rod 22. The actuating pressure also holds the preliminary valve 27 to its seat, the pressure being admitted to the top of the valve stem 27 to prevent cushioning through the relatively small passage 28 formed in the bonnet 19.

When the preliminary valve 27 is raised from its seat by the valve rod 22, the pressure passes through the opening in the valve 21 to the chamber below the valve, and beneath a piston 29 carried by the valve 21, the piston 29 presenting a larger area than that of the valve 21 so that the pressure beneath the piston 29 raises the same and opens the main valve 21. The pressure from the bonnet 19 passes into the supply pipe 18. The pipe 18, however, is preferably closed at its inner end by a plug 30 to prevent entrance of the actuating fluid directly therefrom to the top of the casing or cylinder 12. A feed pipe 18ª is branched from an intermediate point of the pipe 18 and leads to the cover 16 of the casing, the pipe 18ª extending in parallelism with the axis of the casing 12 for a purpose which will hereinafter appear.

The casing 12 is provided therein with a float 31 through the middle portion of which extends a tappet rod 32 mounted at its lower and upper ends respectively in bearings 33 and 34 carried by the bottom 15 and the cap 16, and having on the opposite sides of the float suitably adjusted tappet blocks 35 and

36 adapted to be engaged by the float 31 as it rises and falls in the casing 12 and near the completion of the upper and lower movements of the float. The tappet rod 32 has connection near its upper end with the lever 24, the lever 24 being pivoted at one end, as shown to advantage in Fig. 2, to a lug 37 in the top of the casing 12, so that as the tappet rod 32 rises and falls by reason of its engagement with the float 31, the lever 24 will be swung up and down through the above described mechanism to open and close the preliminary valve 27 and bring about the actuation of the inlet valve 21. After the float 31 has raised the tappet rod 32, and the float moves again downwardly in the casing 12, the tappet rod and the parts connected thereto would drop by gravity to close the inlet valve 21. In order to prevent such premature closing of the inlet valve 21, a frictional locking device is employed which, as shown in detail in Figs. 6 and 7, comprises a pair of supports 38 suitably hinged upon a boss 39 projecting upwardly from the cap 16 of the casing and about the upper end of the tappet rod 32. The supports 38 are located at the opposite sides of the tappet rod, and lean inwardly toward one another and against the opposite sides of the rod 32. Anti-friction rollers 40 are mounted in the supports 38 for engagement with the sides of the tappet rod 32, the supports being held yieldingly against the rod by springs 41 carried upon connecting rods 42 passing through the upper ends of the supports 38 and at the opposite sides of the tappet rod 32.

The upper ends of the supports 38 are flared outwardly from the tappet rod to accommodate a shoulder 43 in the form of a sleeve surrounding the upper end of the tappet rod, the shoulder 43 when the rod is raised being adapted to engage at its lower end upon the rollers 40 and to thus yieldingly support the tappet rod. As the tappet rod is drawn down by the float 31, the increased pressure on the rod forces the supports 38 apart against the tension of the springs 41 and permits the shoulder 43 to pass down between the rollers. As will be seen from Fig. 6 the sleeve 43 is tapered at its lower end whereby to spread apart the supports 38 and admit the passage of the shoulder 43 downwardly therebetween. The sleeve is otherwise of uniform diameter so that the tappet rod 32 and the sleeve 43 may move up and down without undue friction. Suitable locking nuts 44 are carried upon the rods 42 for adjusting the tension of the springs 41.

The float 31 is provided, preferably at its central portion, with a sleeve 47 extending entirely therethrough and being secured by air tight joints to the top and bottom of the float to seal the sleeve 47 therein and provide a guide through which the tappet rod 32 may freely pass. The float 31 is also provided with reinforcing rods 48 for stiffening the float and preventing the collapsing or expanding of the upper and lower faces thereof under the fluid and vacuum pressures to which the float is subjected. The float 31 is furthermore provided with a ring 31$^a$, see Figs. 1 and 2, fitting with a relatively close fit the casing 12, so as to increase the piston effect of the float.

In order that a highly buoyant float of relatively thin material may be used without danger of its being collapsed under pressure, or being distorted by expansion under vacuum, the actuating fluid under pressure is, by the devices of this invention, primarily admitted to the float through pipe 18$^a$ and the pipe 49 which is carried by and opens into the top of the float, the pipe 49 projecting vertically upward into the pipe 18$^a$ and having telescoping movement therein.

As may be seen from Fig. 3 the float pipe 49 projects up into a gland nut 50 screwed into the bottom side of the cap 16 in alinement with the pipe 18$^a$, the gland nut 50 being counter-bored at its upper end and carrying therein a plurality of packing rings 51 and 52.

The rings are preferably three in number, the rings 51 being spaced apart and closely fitting the counterbore in the gland nut 50, while the ring 52 is preferably of less diameter than the rings 51, closely embraces the float pipe 49, and rests loosely between the packing rings 51. In this manner any lateral movement or vibration of the float 31 is permitted without injury to the pipe 49 and its connection or binding of the pipe 49 in its telescoping movements, and, furthermore, a coupling sealed against leakage is secured, for the intermediate packing ring 52 is free to move laterally with the pipe 49 into a position, such as is shown in Fig. 5, wherein the intermediate packing ring 52 is eccentric to the gland nut 50 and the rings 51. It is thus seen that the inlet pressure from the pipe 18$^a$ may pass freely into the float 31, through the float pipe 49.

At preferably the opposite side of the float 31, a combined outlet and release valve is located. The top of the float has a pipe 53 descending to near the bottom of the float, as shown in dotted lines in Fig. 1, and through which the fluid under pressure admitted to the float passes upwardly and out into the top of the casing 12. A valve seat 54 is located at the top of the pipe 53 and a valve 55 normally rests thereon, the valve 55 being housed within a cage 56. The valve 55 is provided with an opening therethrough to slidably receive a stem 57, the stem 57 carrying upon its lower end a release valve 58 seating in the lower face of the valve 55 and controlling ports 59 extending entirely through the valve 55. A spring 60 surrounds the stem 57, has one end bearing against the valve 55 and its opposite end engaging a collar 61 adjustable upon the rod 57 to yieldingly hold the rod 57 upwardly and normally close the valve 58.

The pressure in the pipe 53 lifts the valve 55 and admits the pressure to the top of the casing 12 above the float so as to force the float 31 down and eject the water in the trap through the outlet pipe 13 and check valve 14. As the trap fills the float rises on the fluid coming through the inlet pipe 10, the upper end of the rod 57, which projects above the cage 56, strikes the cover 16 of the casing and forces the rod 57 down against the tension of the spring 60 to open the valve 58 and admit of the equalization of pressure in the top of the casing 12 and the interior of the float 31.

In order that atmospheric pressure may be restored in the trap 12, where the same is used as a return trap or a pump, or where the trap is used in a vacuum system, in order that the vacuum may be controlled, I provide a chamber 59 below the bonnet 19, which chamber leads by the pressure outlet pipe 60 to the atmosphere, or, in a vacuum system to the vacuum source, said chamber 59 coupling by means of the pipe 61 with the interior of the casing 12, this passage being controlled by the valve member 62 mounted on the valve operating stem 22 heretofore described. The said valve member 62, as shown in Fig. 2, is closed when the valve 21 is opened, but on closing of the valve 21 the valve 61 moves to open position and permits communication from the casing 12 by pipe 61, chamber 59 and pipe 60 with the atmosphere or vacuum.

It is of course understood that it is within the spirit of this invention to vary the details of construction of the above described embodiment of the invention within the scope of the following claims.

What is claimed is—

1. In a steam trap the combination with a casing having an inlet and an outlet, a float movable in said casing, a source of fluid pressure, inlet means connecting said float with said source of pressure adapted to deliver pressure to the float during its movement, and an outlet connection from said float to said casing.

2. In a steam trap the combination with a casing having an inlet and an outlet, a float movable in said casing, a source of fluid pressure, inlet means connecting said float with said source of pressure adapted to deliver pressure to the float during its movement, and an adjustable inlet connection from said float to said casing.

3. In a steam trap the combination with a casing having an inlet and an outlet, a float movable in said casing, a source of fluid pressure, an inlet pipe extending from said source of pressure to said float and adapted to deliver pressure thereto during movement of the float, and an outlet valve in said float communicating with said casing.

4. In a steam trap, the combination with a casing having an inlet and an outlet, a float movable in said casing, a source of fluid pressure, an inlet pipe extending from said source of pressure to said float and adapted to deliver pressure thereto during movement of the float, and a pressure-operated outlet valve in said float communicating with said casing.

5. In a steam trap, the combination with a casing with an inlet and an outlet, a float movable in said casing, a source of fluid pressure, an inlet pipe extending from said source of pressure to said float and adapted to deliver pressure thereto during the movement of the float, a pressure-operated outlet valve in said float communicating with said casing, and an equalizing valve operable at predetermined intervals to equalize pressure between said float and casing.

6. In a steam trap, the combination with a casing having an inlet and an outlet, of a float movable in said casing, a source of pressure, a connection between said source of pressure and said float, pressure regulating means in said connection operated by the movements of said float, a pressure-operated outlet valve in said float delivering to said casing, and a mechanically-operated equalizing valve operable at predetermined intervals to equalize pressure in said float and casing.

7. In a steam trap, the combination with a casing having an inlet and an outlet, of a float movable in said casing, a source of pressure, a connection between said source of pressure and said float, pressure regulating means in said connection operated by the movements of said float, a pressure-operated outlet valve delivering from said float to said casing, and an equalizing valve carried by said outlet and operable at certain intervals to equalize pressure in said float and casing.

8. In a steam trap, the combination with a casing having an inlet and an outlet, of a float movable in said casing, a source of pressure, a connection between said source of pressure and said float, pressure regulating means in said connection operated by the movements of said float, a pressure-operated outlet valve delivering from said float to said casing, and a spring-held normally closed equalizing valve carried by said outlet valve and operable at certain intervals to equalize pressure in said float and casing.

9. In a device of the class described, the combination with a casing having a fluid inlet, a fluid outlet, a pressure inlet, and a piston float operable in the casing to control the pressure inlet; of a connection between the pressure inlet and the float to admit the actuating fluid initially to the float, said connection being adjustable whereby the actuating fluid may be continuously delivered to the float during the actuating stroke of the same.

10. In a device of the class described, the combination with a casing having a fluid inlet, a fluid outlet, a pressure inlet, and a float controlling said pressure inlet; of a pipe fixed on said float and having telescopic engagement with said pressure inlet whereby to admit the actuating fluid to the float during the actuating thrust of the same.

11. In a device of the class described, the combination with a casing having a fluid inlet, a fluid outlet, an actuating fluid inlet pipe, and a piston float in the casing controlling the admission of the actuating fluid through the pipe; of a float pipe fixed to the float and having a telescopic engagement with said actuating fluid pipe, and an adjustable packing between the actuating fluid pipe and the float pipe to admit of the free lateral play of the float pipe in the actuating fluid pipe incident to the movement of the float.

12. In a device of the class described, the combination with a casing having a fluid inlet, a fluid outlet, an actuating fluid inlet pipe, and a piston float in the casing controlling the admission of the actuating fluid through the pipe; of a float pipe fixed to the float and having telescopic engagement with said actuating fluid pipe, independent means to maintain the fluid pressure pipe open for a predetermined length of time to admit pressure to the float during the actuating stroke thereof, and an adjustable packing between the actuating fluid pipe and the float pipe to admit of the free lateral play of the float pipe in the actuating fluid pipe incident to the movement of the float.

13. In a device of the class described, the combination with a casing having a fluid inlet, a fluid outlet, a pressure inlet pipe, and a piston float controlling the admission of an actuating fluid through the pressure inlet pipe; of a float pipe on said float telescopically engaging into said pressure inlet pipe, spaced apart packing rings in said pressure inlet pipe spaced about the float pipe, and a packing ring on the float pipe between said first packing rings and having a diameter less than that of the pressure inlet pipe whereby to admit of the lateral movement of the float pipe in the pressure inlet pipe.

14. In a device of the class described, the combination with a casing having a fluid inlet, a fluid outlet, a pressure inlet, and a piston float in the casing controlling the pressure inlet; of an adjustable connection between the pressure inlet and the float to deliver the actuating fluid directly to the float, and means for controlling the egress of the actuating fluid from the float to the top of the casing.

15. In a device of the class described, the combination with a casing having a fluid inlet, a fluid outlet, a pressure inlet, and a float to control the pressure inlet; of an adjustable connection between said pressure inlet and said float to deliver the pressure fluid initially to the interior of the float, and valves in the float to control the admission of the pressure fluid from the float to the casing.

16. In a device of the class described, the combination with a casing having a fluid inlet, a fluid outlet, a pressure inlet, and a float in said casing; of an adjustable connection between said pressure inlet and the float to deliver the actuating fluid directly into the float, a valve controlling the outlet of the actuating fluid from the float into the top of said casing, and a second valve on said float for equalizing the pressure against the inner and outer sides of the float.

17. In a device of the class described, the combination with a casing having a pressure inlet, and a float in said casing, of an adjustable connection between said pressure inlet and the float to deliver the actuating fluid directly into the float, a pipe projecting downwardly in the float to near the bottom thereof, a valve at the top of said pipe to admit the outflow of fluid from the float, a second valve carried by the first valve, said first valve having ports therethrough controlled by said second valve, a stem on said second valve slidably mounted on the first valve, a collar adjustable on said stem, a spring between said collar and said first valve for normally seating the second valve, and means for opening said second valve upon the limit of the upward travel of the float.

18. In a device of the class described, the combination with a casing having a fluid pressure inlet, and a float in the casing communicating with said inlet, an outwardly opening valve on the float admitting of the passage of the fluid under pressure from the float into the casing, and a second valve on the float operable independently of the first valve and adapted to be opened upon the limit of the upward movement of the float to equalize the inner and outer pressures with respect to the float.

19. In a steam trap, the combination with a casing having a fluid outlet and a fluid inlet, of a source of pressure, a float movable in said casing and having a fluid pressure inlet and a fluid pressure outlet, of a connection between said source of pressure having pressure regulating means operated by said float and adapted to deliver pressure thereto during movement of the float.

20. In a device of the class described, the combination with a casing having a fluid inlet, a fluid outlet, a pressure inlet, a rising and falling float in the casing, and a tappet rod in the path of the float adapted to be actuated thereby upon the extreme limits of travel of the float to open and close said pressure inlet; of a pair of hinged members carried above the casing, springs connecting the members for drawing the same together against the opposite sides of the tappet rod, and a shoulder on the tappet rod for engagement with said hinged members when the tappet rod is raised whereby to yieldingly maintain the tappet rod in raised position.

In testimony whereof I have hereunto set my hand in presence of two subscribing witnesses.

JARARD W. LYTTON.

Witnesses:
C. C. VAUGHN, Jr.,
J. C. WILBER.

Copies of this patent may be obtained for five cents each, by addressing the "Commissioner of Patents, Washington, D. C."